United States Patent
Morita

(10) Patent No.: US 10,836,262 B2
(45) Date of Patent: Nov. 17, 2020

(54) ELECTRIC POWER GENERATION CONTROL DEVICE

(71) Applicant: DENSO CORPORATION, Kariya (JP)

(72) Inventor: Yoshinori Morita, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 15/480,571

(22) Filed: Apr. 6, 2017

(65) Prior Publication Data

US 2017/0291494 A1 Oct. 12, 2017

(30) Foreign Application Priority Data

Apr. 6, 2016 (JP) .................. 2016-076714

(51) Int. Cl.
| | |
|---|---|
| *B60L 7/18* | (2006.01) |
| *B60L 15/20* | (2006.01) |
| *B60L 58/12* | (2019.01) |
| *B60L 58/20* | (2019.01) |
| *B60L 7/26* | (2006.01) |
| *H02P 3/14* | (2006.01) |
| *H02P 3/04* | (2006.01) |

(52) U.S. Cl.
CPC .................. *B60L 7/18* (2013.01); *B60L 7/26* (2013.01); *B60L 15/2009* (2013.01); *B60L 58/12* (2019.02); *B60L 58/20* (2019.02); *H02P 3/14* (2013.01); *H02P 3/04* (2013.01); *Y02T 10/645* (2013.01); *Y02T 10/7005* (2013.01); *Y02T 10/7044* (2013.01); *Y02T 10/7066* (2013.01); *Y02T 10/72* (2013.01); *Y02T 10/7275* (2013.01)

(58) Field of Classification Search
CPC ................. B60L 7/18; B60L 7/26; H02P 3/14
USPC .......................................... 310/365
See application file for complete search history.

(56) References Cited

U.S. PATENT DOCUMENTS 5,433,512 A * 7/1995 Aoki ........................ B60L 7/10
                                                                       180/165
9,387,765 B2 * 7/2016 Naito ........................ B60T 1/10
(Continued)

FOREIGN PATENT DOCUMENTS

| CN | 103326648 | * | 9/2013 | |
|---|---|---|---|---|
| CN | 103326648 A | * | 9/2013 | ............ B50R 16/03 |
| JP | 2013-198318 A | | 9/2013 | |

*Primary Examiner* — Eduardo Colon Santana
*Assistant Examiner* — Devon A Joseph
(74) *Attorney, Agent, or Firm* — Oliff PLC

(57) ABSTRACT

An electric power generation control device applied to a system including a generator capable of regenerative electric power generation, an electric power storage device capable of being charged with electric power, and a friction brake device that generates a braking force. The control device includes an operation amount acquisition unit that acquires a brake operation amount by the driver, an electric power generation amount acquisition units that increase a target electric power generation amount for the generator the larger the brake operation amount is, and have plural relationships of which the target electric power generation amounts that correspond to a certain brake amount differ, and acquire the target electric power generation amount according to one of the relationships based on change in the brake operation amount, and an electric power generation amount instruction unit that controls the generator based on the target electric power generation amount.

15 Claims, 11 Drawing Sheets

(56) References Cited

U.S. PATENT DOCUMENTS

| | | | |
|---|---|---|---|
| 9,393,875 B2* | 7/2016 | Okano | B60T 1/10 |
| 9,751,517 B2* | 9/2017 | Choi | B60W 20/14 |
| 10,005,435 B2* | 6/2018 | Gotoh | B60T 7/06 |
| 2005/0269875 A1* | 12/2005 | Maki | B60T 8/4872 |
| | | | 303/152 |
| 2017/0137031 A1* | 5/2017 | Yamaguchi | B60L 7/16 |

* cited by examiner

ELECTRIC POWER GENERATION CONTROL DEVICE

CROSS-REFERENCE TO RELATED APPLICATION

This application is based on and claims the benefit of priority from earlier Japanese Patent Application No. 2016-76714 filed Apr. 6, 2016, the descriptions of which are incorporated herein by reference.

BACKGROUND

Technical Field

The present invention relates to an electric power generation control device for controlling a generator that is installed in a vehicle.

Related Art

Conventionally, a generator is provided on the drive shaft of a vehicle, and regenerative electric power generation is performed for driving the generator when the vehicle is travelling at low speed.

As a device related to an electric power generation control device for performing regenerative electric power generation, there is an electric power generation control device such as described in JP-A-2013-198318. In the electric power generation control device described in JP-A-2013-198318, it is possible to increase the electric power generation amount and maintain drivability by increasing a target electric power generation amount by regenerative electric power generation the larger the amount that the driver operates the brake.

In the case of the electric power generation control device in JP-A-2013-198318, it is possible to increase the regenerative electric power generation amount, however there is still room for improvement in order to further increase the regenerative electric power generation amount. Incidentally, when the regenerative electric power generation amount is increased unreasonably, the vehicle may operate at an excessively low speed due to regenerative electric power generation even when the driver does not require low speed, which leads to a decrease in drivability.

The present invention was achieved in order to solve the problem described above, with the main object of the present invention being to provide an electric power generation control device that is able to maintain drivability while at the same time further increase the target electric power generation amount of regenerative electric power generation.

SUMMARY

According to one aspect of the present invention, an electric power generation control device that is applied to a system that includes: a generator that is connected to a drive shaft of a vehicle and is capable of regenerative electric power generation using regenerative energy during deceleration of the vehicle; an electric power storage device that is capable of being charged with electric power that is generated by the generator; and a friction brake device that generates a braking force according to a brake operation by a driver; the electric power generation control device includes: an operation amount acquisition unit that acquires a brake operation amount by the driver of the vehicle; an electric power generation amount acquisition units that increase a target electric power generation amount for the generator the larger the brake operation amount is, and have plural relationships of which the target electric power generation amounts that correspond to a certain brake amount differ, and acquire the target electric power generation amount according to one of the relationships based on change in the brake operation amount; and an electric power generation amount instruction unit that controls the generator based on the target electric power generation amounts that are acquired by the electric power generation amount acquisition units.

Having plural relationships that have different target electric power generation amounts that correspond to a certain brake operation amount means that there are plural functions that are a straight line or curved line that indicate a relationship between the brake operation amount and the target electric power generation amount. Acquiring a target electric power generation amount according to one of these relationships means selecting one of the functions that is a straight line or curved line, and using that function and the brake operation amount to acquire the target electric power generation amount. Moreover, change in the brake operation amount refers to a differential value in the brake operation amount for example. In the configuration described above, the target electric power generation amount is acquired from one of the plural relationships according to change in the brake operation amount by the driver, so a target electric power generation amount can be set according to the intention of the brake operation by the driver. Therefore, it is possible to both increase the regenerative electric power generation amount and maintain drivability.

Specifically, when the driver increases the brake operation amount, by setting the target electric power generation amount from a relationship that increases according to that brake operation, it is possible to set the target electric power generation amount according to the intention of the brake operation by the driver. When the brake operation amount changes from increasing to decreasing, by maintaining the target electric power generation amount or by decreasing the amount of reduction in the target electric power generation amount, it is possible to further increase the regenerative electric power generation amount. However, when the brake operation amount continues to decrease, there is a high possibility that the driver does not require a braking force. In that case, by decreasing the target electric power generation amount more than when the brake operation amount is increasing, it is possible for the regenerative braking force to follow the intention of the brake operation of the driver.

DESCRIPTION OF SPECIFIC EMBODIMENTS

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

First Embodiment

A power generation control ECU, which is the electric power generation control device of this embodiment, is installed in a vehicle having an internal combustion engine as the driving source, and this power generation control ECU performs regenerative electric power generation using regenerative energy during low speed operation of the vehicle, and supplies that generated electric power to an electric power storage device.

Figure 1:
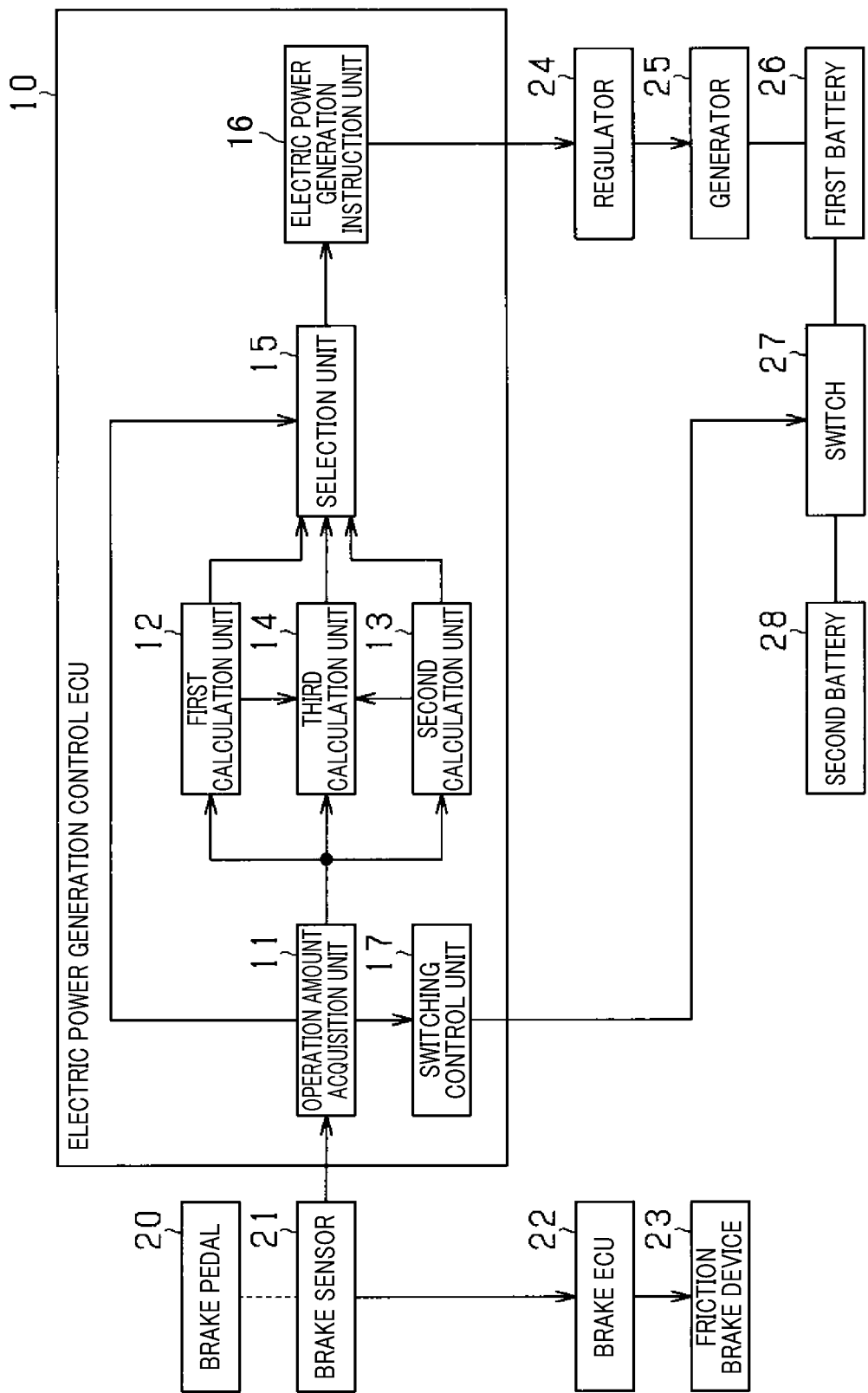
FIG. 1 is a schematic diagram of the overall power generation control system.

First, the configuration of a brake system that includes the power generation control ECU will be explained using FIG. 1. The brake operation amount, which is the amount that a brake pedal 20 is operated by the vehicle driver, is detected by a brake sensor 21. Specifically, the brake sensor 21 calculates the stroke amount of the brake pedal 20, and takes that stroke amount to be the brake operation amount.

The brake operation amount that is acquired by the brake sensor 21 is inputted to a brake ECU 22. The brake ECU 22 calculates the brake pressure of a friction brake device 23 based on the acquired brake operation amount, and controls the pressure of a master cylinder. The friction brake device 23 generates a larger braking force the larger the pressure of the master cylinder is. The brake ECU 22 also has a function for an anti-lock brake system, and a function for distributing the brake pressure, however, these are known functions, so a detailed explanation will be omitted here.

The electric power generation control ECU 10 acquires the brake operation amount in the same way as the brake ECU 22. Then, the electric power generation control ECU 10 sends an instruction for the amount of power generation to a regulator 24 based on the acquired brake operation amount. The generator 25 is a device that generates power by using the rotational energy of the vehicle drive shaft. Specifically, the rotor of the generator 25 is connected with the drive shaft so as to be able to transmit power, and as the drive shaft rotates, an alternating current is induced in a stator coil according to an excitation current that flows in a rotor coil, and the alternating current is converted to a direct current by a rectifier (not illustrated in FIG. 1).

This direct current electric power can be supplied to a first battery 26 and a second battery 28. Specifically, the generator 25, the first battery 26 and the second battery 28 are connected in parallel. The second battery 28 is a battery having a higher energy efficiency, which is the ratio of the dischargeable electric power amount with respect to the charged electric power amount, than the first battery 26. That is, the first battery 26 is a lead battery, for example, and the second battery 28 is a lithium ion battery, for example. The first battery 26 can be referred to as a first electric power storage device, and the second battery 28 can be referred to as a second electric power storage device.

The generator 25, first battery 26 and second battery 28 are connected by way of a switch 27. This switch 27 is switched by the electric power generation control ECU 10 between a conducting state and a blocked state. When that switch 27 is in the conducting state, electric power that is generated by the generator 25 can be supplied to the first battery 26 and second battery 28. However, when the switch 27 is in the blocked state, electric power that is generated by the generator 25 can be supplied to the first battery 26, however is not supplied to the second battery 28.

Continuing, the electric power generation control ECU 10 will be explained in detail. An operation amount acquisition unit 11 of the electric power generation control ECU 10 inputs the acquired brake operation amount to first to third calculation units 12 to 14. The first to third calculation units 12 to 14 calculate first to third electric power generation amounts, respectively, based on the acquired brake operation amount, and input the amount to a selection unit 15. The brake operation amount that was acquired by the operation amount acquisition unit 11 is also inputted to the selection unit 15, and the selection unit 15, using the first to third electric power generation amounts calculated by the first to third calculation units 12 to 14, and the brake operation amount, selects one of the first to third electric power generation amounts as the target electric power generation amount for the generator 25. The target electric power generation amount that was obtained by the selection unit 15 is inputted to an electric power generation amount instruction unit 16, and the electric power generation amount instruction unit 16 transmits a control instruction to the regulator 24. By calculating a target electric power generation amount in this way, the first to third calculation units 12 to 14 and the selection unit 15 can be said to function as a power generation amount acquisition unit.

Figure 2:
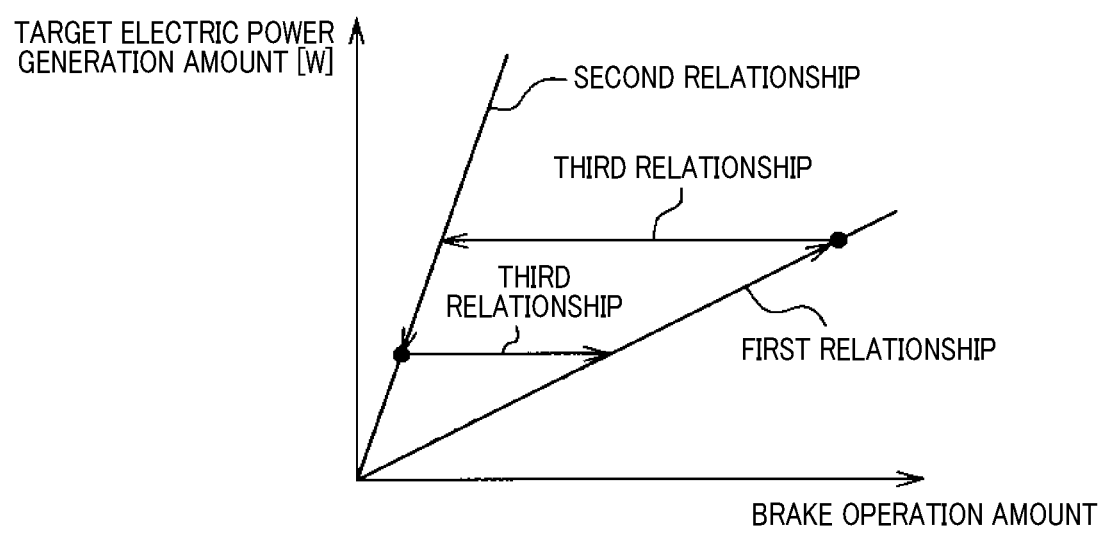
FIG. 2 illustrates the relationship between the brake operation amount and the target electric power generation amount in a first embodiment.

The first to third electric power generation amounts that are calculated by the first to third calculation units 12 to 14 are set based on first to third relationships, which are the relationships between the brake operation amount and the electric power generation amounts. These first to third relationships will be explained using FIG. 2.

The first relationship is a relationship in which the first electric power generation amount becomes larger the larger the brake operation amount becomes. Specifically, the first relationship is a relationship in which the first electric power generation amount is directly proportional to the brake operation amount. This first relationship is a relationship that is used when the brake operation amount increases.

The second relationship is a relationship in which the first electric power generation amount becomes larger the larger the brake operation amount becomes, and the second electric power generation amount that corresponds to a certain brake operation amount is a value that is greater than the first electric power generation amount that corresponds to that brake operation amount. Specifically, this relationship is a relationship in which the electric power generation amount is directly proportional to the brake operation amount, and the proportionality coefficient is larger than that of the first relationship. This second relationship is a relationship that is used when the brake operation amount decreases.

The third relationship is a relationship that is switched from the first relationship when the brake operation amount changes from increasing to decreasing when the first electric power generation amount that is obtained based on the first relationship is the target electric power generation amount. Moreover, this third relationship is a relationship that is switched from the second relationship when the brake operation amount changes from decreasing to increasing when the second electric power generation amount that is obtained based on the second relationship is the target electric power generation amount. When switched from the first relationship, this third relationship is a relationship in which the first electric power generation amount at the time of switching is maintained, and when switched from the second relationship, this third relationship is a relationship in which the second electric power generation amount at the time of switching is maintained. In other words, in both the case of switching from the first relationship and the case of switching from the second relationship, the third relationship can be said to be a relationship in which the target electric power generation amount at the time of switching is maintained.

Switching from the third relationship to the second relationship is performed when the third electric power generation amount is taken to be the target electric power generation amount and the second electric power generation amount is less than the third electric power generation amount. Moreover, switching from the third relationship to the first relationship is performed when the third electric power generation amount is taken to be the target electric power generation amount and the first electric power generation amount is greater than the third electric power generation amount. In other words, when the third electric power generation amount is taken to be the target electric power generation amount and the value of the third electric power generation amount is equal to or greater than the first electric power generation amount and equal to or less than the second electric power generation amount, and even when the brake operation amount changes from increasing to decreasing, or from decreasing to increasing, the state in which the third electric power generation amount is selected as the target electric power generation amount is maintained.

The third relationship is set in this way, so when the brake operation amount is within a specified range, the third relationship can be said to be a relationship in which the target electric power generation amount is set to be larger than in the first relationship, and the target electric power generation amount is set to be less than in the second relationship.

However, a switching control unit 17 determines whether the switch 27 is in a conducting state or a blocked state based on the brake operation amount that is acquired from the operation amount acquisition unit 11, and performs that switching. Specifically, when a brake operation by the driver is detected, in other words, when regenerative electric power generation is performed, the switching control unit 17 sets the switch 27 to the conducting state, and electric power generated by regenerative electric power generation is supplied to the second battery 28. When no brake operation by the driver is detected, the switching control unit 17 monitors the charged state of the second battery 28 and based on the charged state, determines whether to switch the switch 27 to the conducting state or to the blocked state. A known method can be applied for the control in this case, so a detailed explanation is omitted.

Figure 3:
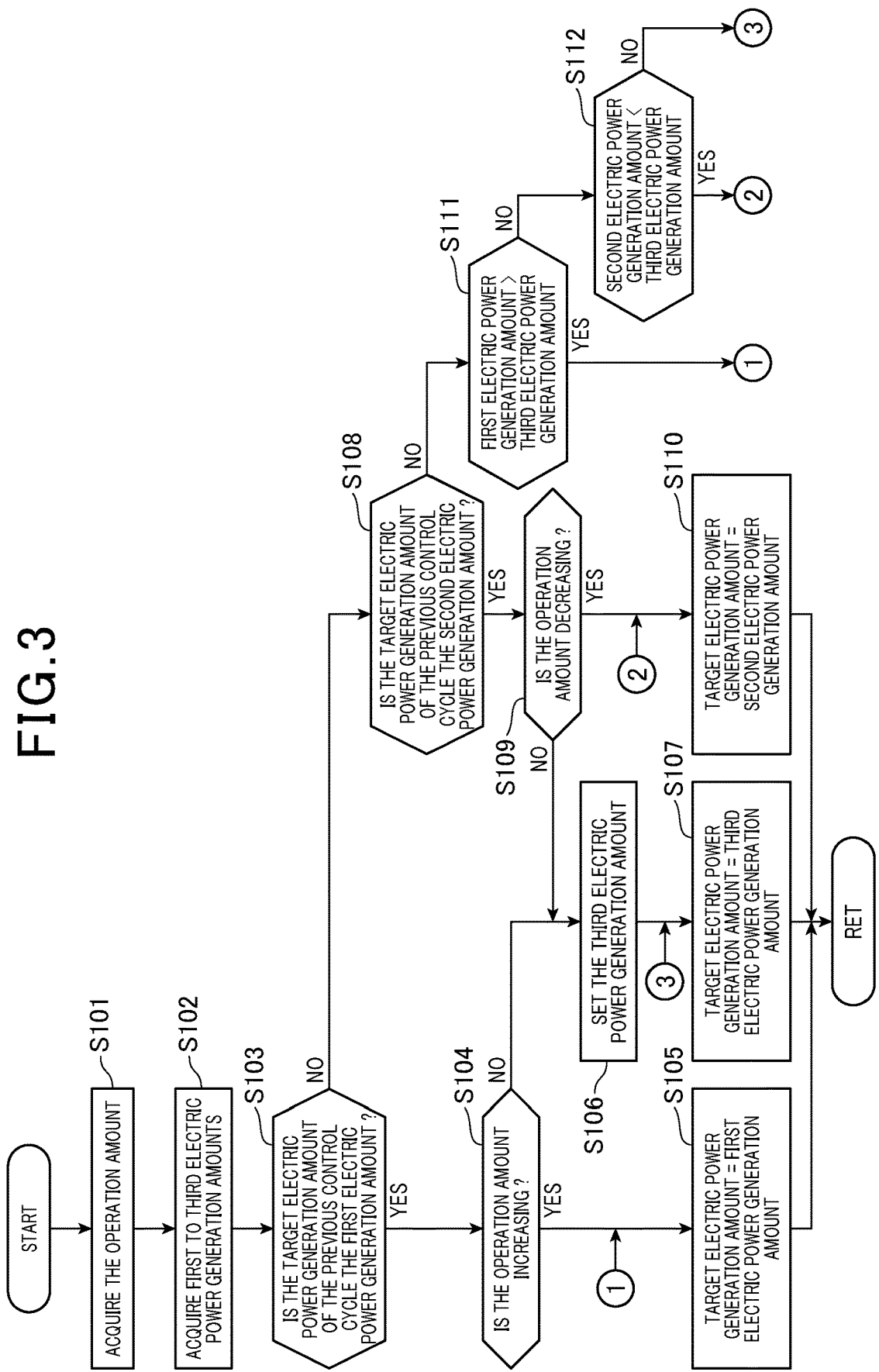
FIG. 3 is a flowchart illustrating the processing in a first embodiment.

Continuing, a sequence of processes that are executed by the power generation control ECU 10 will be explained using the flowchart in FIG. 3. The processing in the flowchart in FIG. 3 is repeatedly executed for each specified control cycle.

First, in step S101 the electric power generation control ECU 10 acquires the brake operation amount, then, in step S102, calculates the first electric power generation amount to third electric power generation amount based on the first to third relationships. The first electric power generation amount and second electric power generation amount are proportional to the brake operation amount, so can be calculated as is in step S102. However, the third electric power generation amount, as was described above, is the amount that will maintain the first electric power generation amount when the first electric power generation amount is taken to be the target electric power generation amount and at the point where the brake operation amount changes from increasing to decreasing. Therefore, from when the brake operation is started until the brake operation amount first changes from increasing to decreasing a value of zero can be set as the value of the third electric power generation amount. Moreover, when the brake operation amount changes from increasing to decreasing, the value of the third electric power generation amount is set as the value of the first electric power generation amount during the previous control cycle, so from when brake operation starts until the brake operation amount first changes from increasing to decreasing, the value of the first electric power generation amount during the previous control cycle can be set as the value of the third electric power generation amount.

Next, in step S103, the electric power generation control ECU 10 determines whether or not the first electric power generation amount was selected as the target electric power generation amount during the previous control cycle. In step S103, when the determination is positive, or in other words, when the target electric power generation amount during the previous control cycle is the first electric power generation amount, processing advances to step S104. In step S104, the electric power generation control ECU 10 determines whether or not the brake operation amount is increasing. Specifically, the electric power generation control ECU 10 determines whether or not the brake operation amount is increasing by comparing the brake operation amount during the previous control cycle with the brake operation amount during the current control cycle. In step S104, when the determination is positive, or in other words, when it is determined that the brake operation amount is increasing, the electric power generation control ECU 10 sets the target electric power generation amount as the first electric power generation amount in step S105 and ends the sequence of processing.

However, in step S104, when the determination is negative, or in other words, when it is determined that the brake operation amount is decreasing, it means that the brake operation amount has changed from increasing to decreasing when the first electric power generation amount was taken to be the target electric power generation amount. Therefore, the electric power generation control ECU 10 advances to step S106 and sets the value of the target electric power generation amount during the previous control cycle as the third electric power generation amount. In other words, the electric power generation control ECU 10 sets the value of the first electric power generation amount during the previous control cycle as the third electric power generation amount. Then, in step S107, the electric power generation control ECU 10 sets the target electric power generation amount to be the third electric power generation amount and ends the sequence of processing.

Returning to the explanation of step S103, when the determination in step S103 is negative, or in other words, when the target electric power generation amount during the previous control cycle is not the first electric power generation amount, the electric power generation control ECU 10 advances to step S108. In step S108, the electric power generation control ECU 10 determines whether or not the second electric power generation amount is selected as the target electric power generation amount of the previous control cycle. In step S108, when the determination is positive, or in other words, when the target electric power generation amount of the previous control cycle is the second electric power generation amount, the electric power generation control ECU 10 advances to step S109. In step S109, the electric power generation control ECU 10 determines whether or not the brake operation amount is decreasing. Specifically, the electric power generation control ECU 10 determines whether or not the brake operation amount is decreasing by comparing the brake operation amount in the previous control cycle with the brake operation amount in the current control cycle. In step S109, when the determination is positive, or in other words, when it is determined that the brake operation amount is decreasing, the electric power generation control ECU 10 sets the target electric power generation amount to be the second electric power generation amount in step S110, and ends the sequence of processing.

However, when the determination in step S109 is negative, or in other words, when it is determined that the brake operation is decreasing, this means that the brake operation amount has changed from decreasing to increasing when the second electric power generation amount is taken to be the target electric power generation amount. Therefore, the electric power generation control ECU 10 advances to step S106 and sets the value of the target electric power generation amount during the previous control cycle as the third electric power generation amount. In other words, the electric power generation control ECU 10 sets the value of the second electric power generation amount during the previous control cycle as the third electric power generation amount. Then, in step S107, the electric power generation control ECU 10 sets the target electric power generation amount to be the third electric power generation amount and ends the sequence of processing.

Returning to the explanation of step S108, when the determination in step S108 is negative, or in other words, when the target electric power generation amount during the previous control cycle is not either the first electric power generation amount or the second electric power generation amount, the target electric power generation amount during the previous control cycle is the third electric power generation amount, so the electric power generation control ECU 10 advances to step S111. In step S111, the electric power generation control ECU 10 determines whether or not the first electric power generation amount is greater than the third electric power generation amount. When the determination in step S111 is positive, or on other words, when the first electric power generation amount is greater than the third electric power generation amount, the electric power generation control ECU 10 advances to step S105, sets the target electric power generation amount to be the first electric power generation amount and ends the sequence of processing.

When the determination in step S111 is negative, or in other words, when the first electric power generation amount is equal to or less than the third electric power generation amount, the electric power generation control ECU 10 advances to step S112. In step S112, the electric power generation control ECU 10 determines whether or not the second electric power generation amount is less than the third electric power generation amount. When the determination in step S112 is positive, or in other words, when the second electric power generation amount is less than the third electric power generation amount, the electric power generation control ECU 10 advances to step S110, sets the target electric power generation amount to be the second electric power generation amount and ends the sequence of processing.

When the determination in step S112 is negative, or in other words, when the second electric power generation amount is equal to or greater than the third electric power generation amount, the electric power generation control ECU 10 advances to step S107, sets the target electric power generation amount to be the third electric power generation amount, and ends the sequence of processing. As was described above, advancing to step S112 is performed when the determination in step S111 is negative. Therefore, when the third electric power generation amount is equal to or greater than the first electric power generation amount and is equal to or less than the second electric power generation amount, the electric power generation control ECU 10 is said to advance to step S107.

Figure 4:
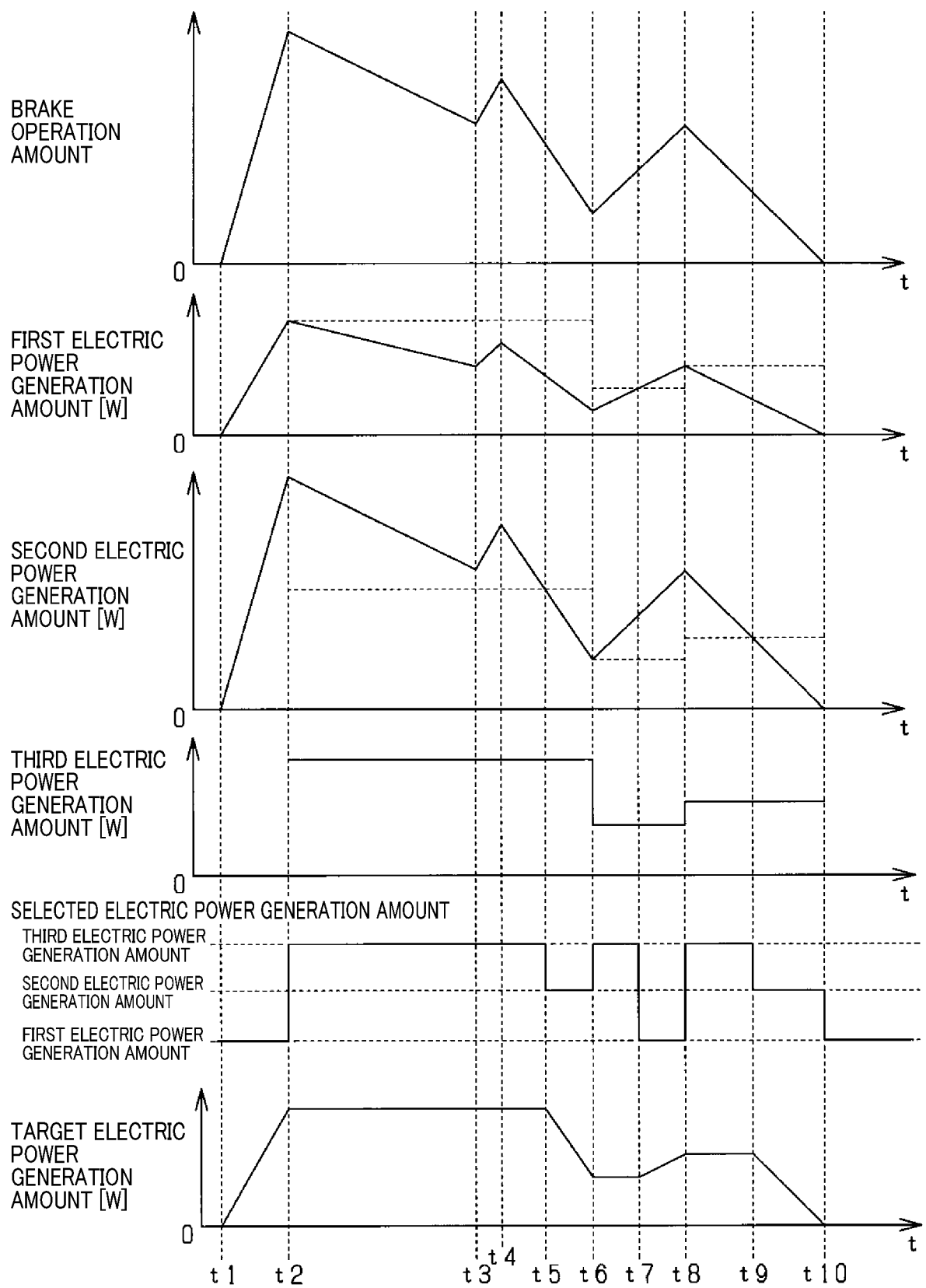
FIG. 4 is a time chart illustrating the processing in a first embodiment.

Continuing, the brake operation amount, the first to third electric power generation amounts, the selected electric power generation amount, and the target electric power generation amount from when the driver starts operating the brake pedal 20 until operation ends will be explained using the time charts in FIG. 4. In FIG. 4, the brake operation amount, the first to third electric power generation amounts that are calculated by the first to third calculation units 12 to 14 based on the first to third relationships, the electric power generation amount that is selected from among the first to third electric power generation amounts, and the target electric power generation amount are illustrated. The third electric power generation amount is given in the time chart that illustrates the change in the first electric power generation amount and in the time chart that illustrates the change in the second electric power generation amount in order to make a comparison with the third electric power generation amount.

First, at time t1 the driver starts brake operation, and the first electric power generation amount obtained is selected based on the first relationship. This selection is continued until the brake operation amount changes from increasing to decreasing at time t2. From time t1 to time t2, processing is transferred to step S105 via step S104 in FIG. 3.

At time t2, when the brake operation amount changes from increasing to decreasing, the first electric power generation amount at time t2 is set as the value of the third electric power generation amount. At this time t2, processing is transferred to step S107 via steps S104 and S106 in FIG. 3.

Figure 5:
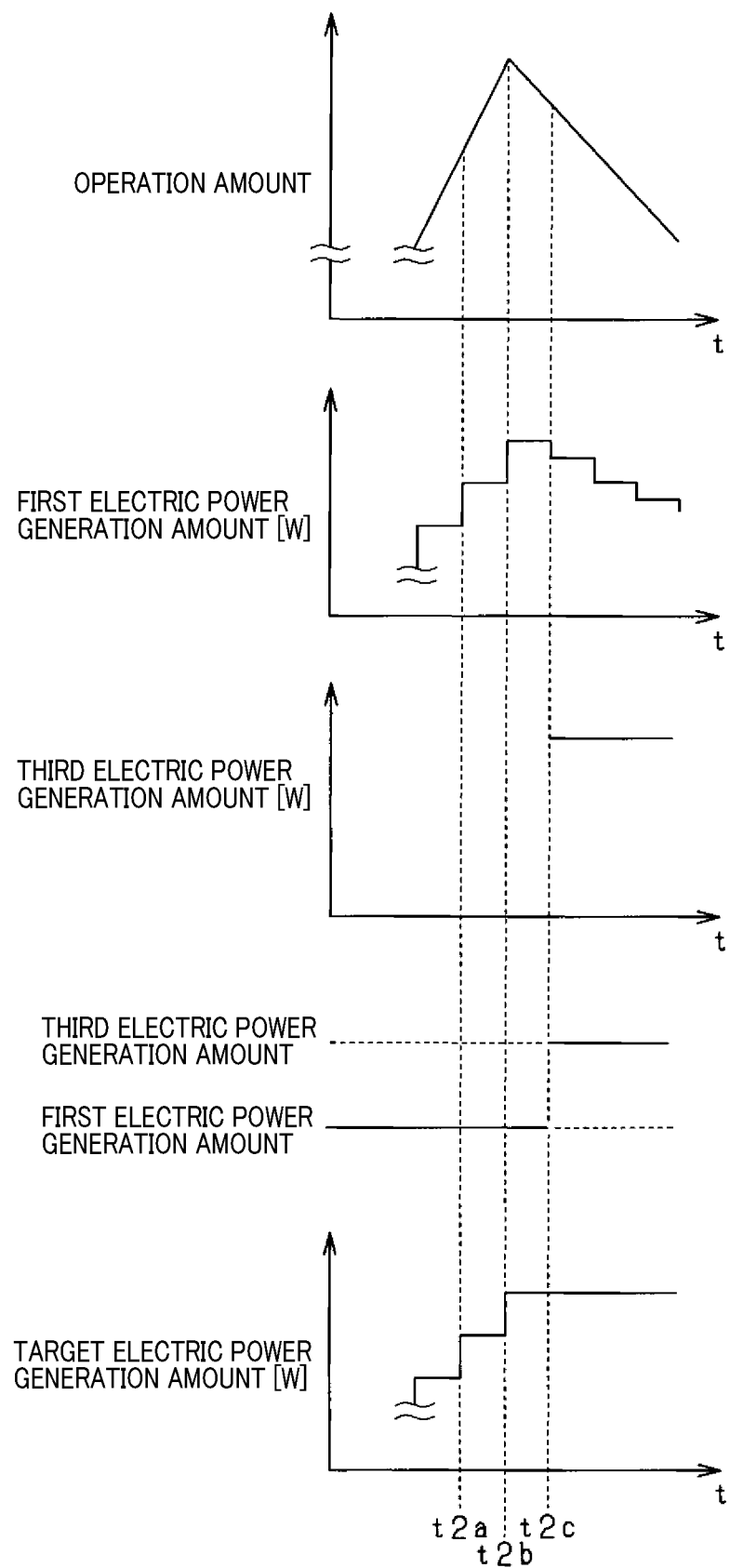
FIG. 5 is a chart that complements the time chart in FIG. 4.

A supplementary explanation of the processing at time t2 will be explained using FIG. 5. In FIG. 5, time t2a, time t2b and time t2c indicate time during a continuous control cycle.

At time t2*b* when the brake operation amount becomes the maximum, the brake operation amount at time t2*a*, which is the previous control cycle, is compared with the brake operation amount at time t2*b*. Therefore, at time t2*b*, processing is transferred to step S105 via step S104 in FIG. 3, and the first electric power generation amount is selected as the target electric power generation amount based on the brake operation amount at that point in time. Then, at time t2*c*, the brake operation amount at time t2*b*, which is the previous control cycle, is compared with the brake operation amount at time t2*c*. The brake operation amount is less than the brake operation amount of the previous control cycle, so the first electric power generation amount is set as the value of the third electric power generation amount based on the brake operation amount of the previous control cycle, and the third electric power generation amount is selected as the target electric power generation amount. In other words, at time t2*c*, processing is transferred to step S107 via step S104 and step S106 in FIG. 3.

Even when the brake operation amount continues to decrease after time t2 to time t3, the second electric power generation amount does not become less than the third electric power generation amount, so the third electric power generation amount is selected. Even when the brake operation amount changes to increasing at time t3, and the brake operation amount continues to increase to time t4, the first electric power generation amount does not become greater than the third electric power generation amount, so the third electric power generation amount is selected. Even when the brake operation amount changes to decreasing at time t4 and the brake operation amount continues to decrease up to time t5, the second electric power generation amount does not become less than the third electric power generation amount, so the third electric power generation amount is selected. In other words, from time t2 to time t5, the third electric power generation amount is equal to or greater than the first electric power generation amount and equal to or less than the second electric power generation amount, so the third electric power generation amount is selected as the target electric power generation amount. From time t2 to time t5, processing is transferred to step S107 via step S108, step S111 and step S112 in FIG. 3.

At time t5, when the second electric power generation amount becomes less than the third electric power generation amount, the second electric power generation amount is selected as the target electric power generation amount. At this time t5, processing is transferred to step S110 via step S108, step S111 and step S112.

From time t5 to time t6, the brake operation amount gradually decreases, and the second electric power generation amount is selected as the target electric power generation amount. From time t5 to time t6, processing is transferred to step S110 via step S108 and step S109 in FIG. 3.

At time t6, when the brake operation amount changes from decreasing to increasing, the second electric power generation amount, which is the target electric power generation amount at time t6, is set as the value of the third electric power generation amount. At this time t6, processing is transferred to step S107 via step S108, step S109 and step S106 in FIG. 3.

After the brake operation amount changes to increasing at time t6, and until the first electric power generation amount becomes greater than the third electric power generation amount a time t7, the third electric power generation amount is selected. From time t6 to time t7, processing is transferred to step S107 via step S108, step S111 and step S112 in FIG. 3.

When the first electric power generation amount becomes greater than the third electric power generation amount at time t7, the first electric power generation amount is selected as the target electric power generation amount. At this time t7, processing is transferred to step S110 via step S108, step S111 and step S112.

From time t7 to time t8, the brake operation amount gradually increases, and the first electric power generation amount is selected as the target electric power generation amount. From time t7 to time t8, processing is transferred to step S105 via step S104 in FIG. 3.

At time t8 when the brake operation amount changes from increasing to decreasing, the first electric power generation amount at time t8 is set as the value of the third electric power generation amount. At this time t8, processing is transferred to step S107 via step S104 and step S106 in FIG. 3.

At time t8, after the brake operation amount changes to increasing, and until the second electric power generation amount becomes less than the third electric power generation amount at time t9, the third electric power generation amount is selected. From time t8 to time t9, processing is transferred to step S107 via step S108, step S111 and step S112 in FIG. 3.

At time t9 when the second electric power generation amount becomes less than the third electric power generation amount, the second electric power generation amount is selected as the target electric power generation amount. At this time t9, processing is transferred to step S110 via step S108, step S111 and step S112.

From time t9 to time t10, the brake operation amount gradually decreases, and the second electric power generation amount is selected as the target electric power generation amount. From time t9 to time t10, processing is transferred to step S110 via step S108 and step S109 in FIG. 3.

When the brake operation amount becomes zero at time t10, the first electric power generation amount and the second electric power generation amount become zero. At this time, the third electric power generation amount is not selected as the target electric power generation amount, so zero may be set as the value of the third electric power generation amount, or the third electric power generation amount set at time t8 may be maintained. Moreover, when the driver starts the brake operation after the brake operation amount becomes zero, the first electric power generation amount is selected as the target electric power generation amount at the start, so that after the time t10, the state in which the first electric power generation amount is selected as the target electric power generation amount may be maintained.

When the generator 25 is driven by setting the target electric power generation amount in this way, regenerative braking force, which is a braking force that is proportional to the target electric power generation amount occurs. The vehicle decelerates due to a combined braking force obtained by adding this regenerative braking force and a friction braking force that occurs due to the friction brake device 23. The relationship between the brake operation amount and the braking force, and the change over time of the braking force when the driver operates the brake pedal 20 so that the combined braking force becomes the target braking force will be explained using FIG. 6 and FIG. 7. In the following explanation, the regenerative braking forces that occur due to the first to third electric power generation amounts will be called the first to third braking forces, respectively.

When the driver operates the brake pedal 20 so that the combined braking force is the target braking force, generally, it is difficult to stop the combined braking force at the target braking force by pressing the pedal once. Therefore, as illustrated in FIG. 7, after the combined braking force once exceeds the target braking force, the combined braking force gradually decreases to below the target braking force, and after that, the combined braking force is gradually increased again until reaching the target braking force.

Specifically, at time t11 when the driver begins stepping on the brake pedal 20, the friction braking force increases until t12 when the brake operation amount becomes a maximum, and the first braking force also increases with this. The combined braking force at this time t12 is larger than the target braking force required by the driver, so the driver reduces the brake operation amount. This operation for reducing the brake operation amount continues until time t13, and at time t13 the combined braking force is less than the target braking force. However, the regenerative braking force is the third braking force that is based on the third electric power generation amount, so even though the driver decreases the brake operation amount, the regenerative braking force at time t12 when the brake operation amount was a maximum is maintained.

After the brake operation amount takes on a minimum value at time t13, the driver operates the brake pedal 20 in order to make the combined braking force equal to the target braking force, so the brake operation amount gradually increases. Then, at time t14 the combined braking force becomes the target braking force. Therefore, even though the combined braking force fluctuates around the target braking force due to fluctuation in the brake operation amount by the driver, the first braking force at time t12 is taken to be the third braking force, and the regenerative braking force is maintained at that value.

Figure 6:
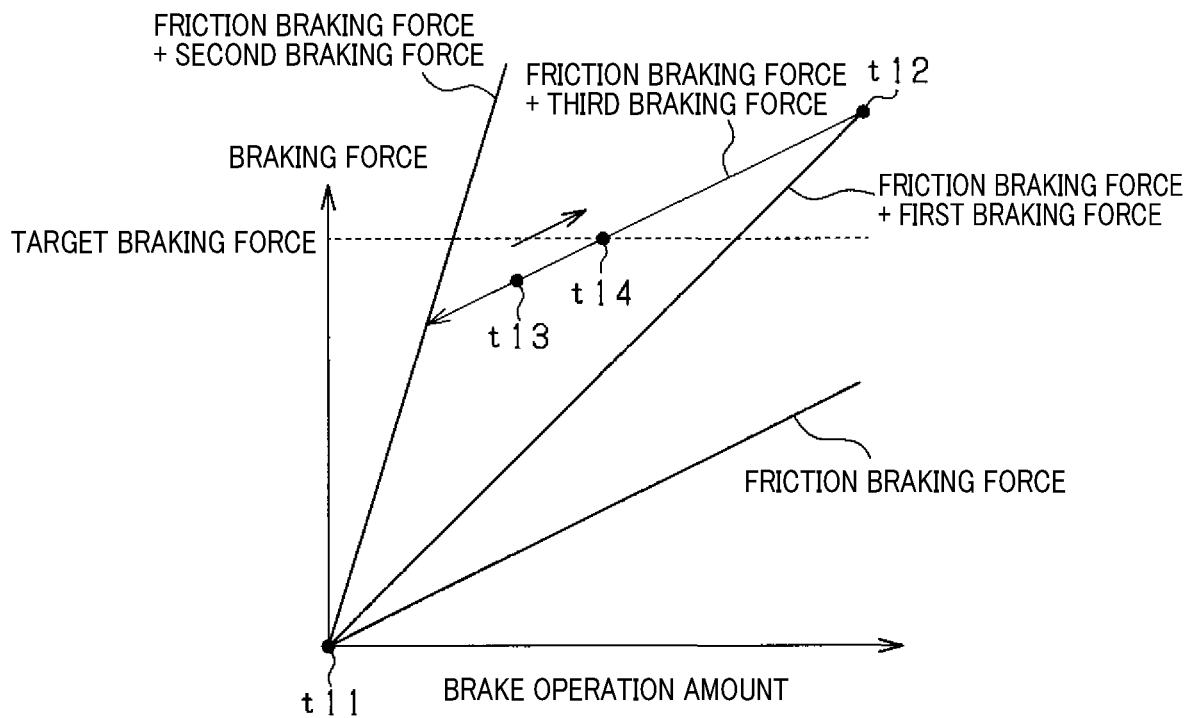
FIG. 6 illustrates the relationship between the brake operation amount and the braking force when maintaining the braking force at a target braking force.
Figure 7:
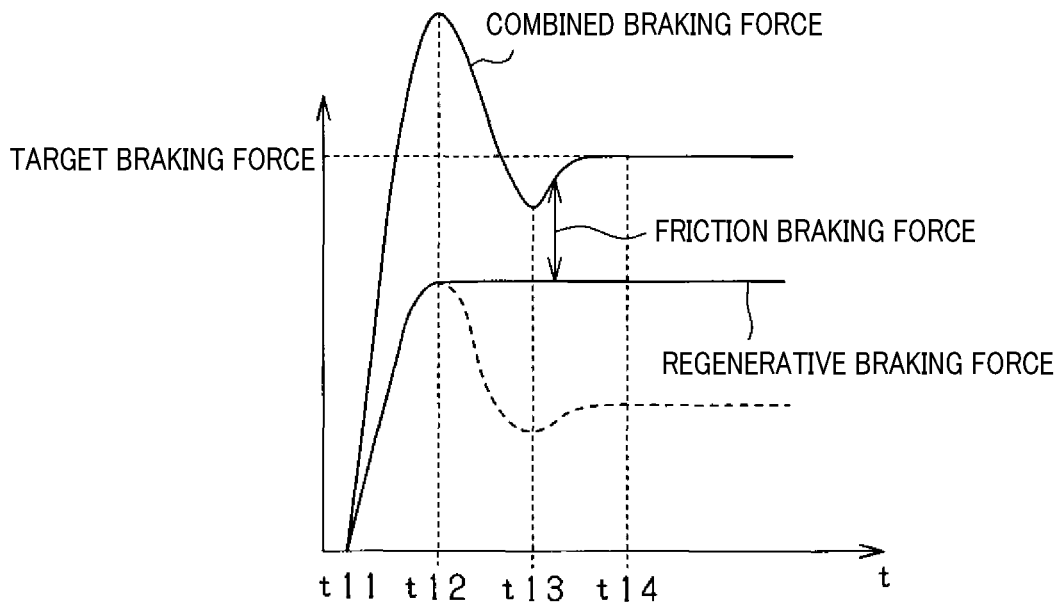
FIG. 7 is a time chart illustrating the change in braking force when maintaining the braking force at a target braking force.

FIG. 6 and FIG. 7 illustrate an example in which before becoming the target braking force, the combined braking force takes on the minimum value and the maximum value one time each, however, similar control can be performed in the case in which the combined braking force takes on at least one of the maximum value and minimum value two times or more. In that case, when the maximum value of the brake operation amount from the second time on is a value that is larger than the maximum value before that, the third electric power generation amount is updated.

FIG. 7 uses a dashed line to illustrate the regenerative braking force when performing power generation control using only the first electric power generation amount. In other words, by setting the target electric power generation amount by switching the first to third relationships as in this embodiment, it is possible to increase the ratio of the regenerative braking force with respect to the target braking force.

Figure 8:
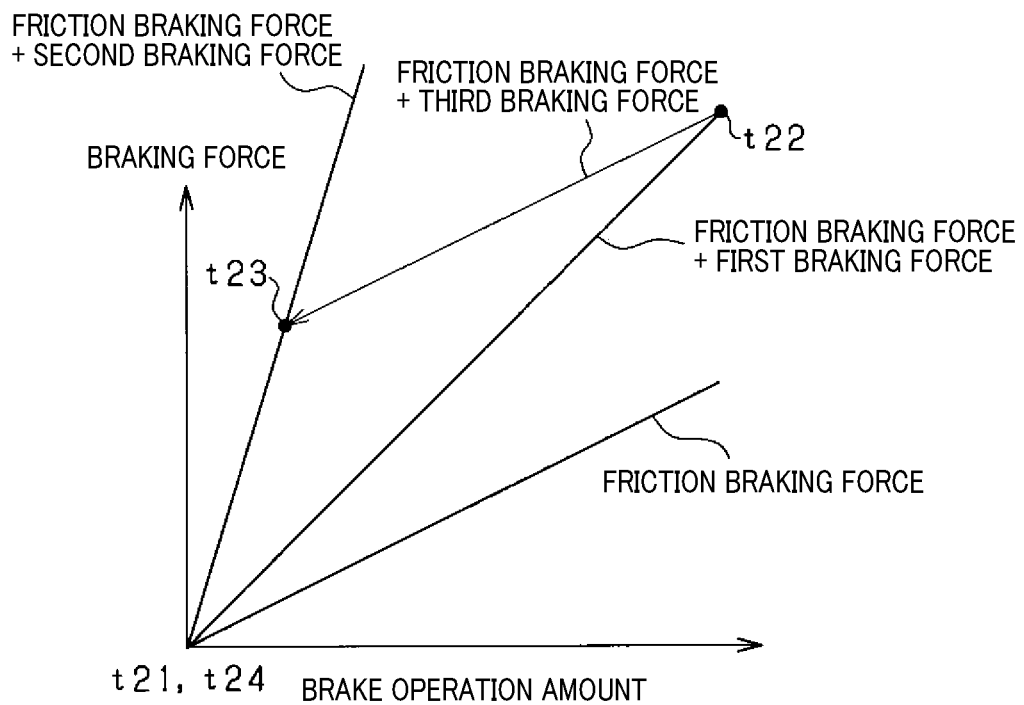
FIG. 8 illustrates the relationship between the brake operation amount and the braking force from the start to the end of a brake operation.

Continuing, the relationship between the brake operation amount and the braking force, and the change over time of the braking force when after the driver steps on the brake pedal 20 and the vehicle slows down until reaching the speed required by the driver, after which the driver ends operation of the brake pedal 20 will be explained using FIG. 8 and FIG. 9.

At time t21, when the driver starts stepping on the brake pedal 20, the friction braking force increases until time t22 where the brake operation amount becomes a maximum, and the first braking force also increases. Even though the brake operation amount gradually decreases from time t22 where the brake operation amount becomes a maximum, at time t23, the third electric power generation amount is less than the second electric power generation amount, so the third electric power generation amount is selected as the target electric power generation amount. Therefore, even though the combined braking force and friction braking force gradually decrease, the regenerative braking force is kept at a constant value. At time t23, when the second electric power generation amount is less than the third electric power generation amount, the second electric power generation amount is selected as the target electric power generation amount, so as the brake operation amount is gradually decreased, the friction braking force and the regenerative braking force gradually decrease. Then, at time t24, when the brake operation amount becomes zero, or in other words, when the driver stops stepping on the brake pedal 20, the regenerative electric power generation amount becomes zero.

Figure 9:
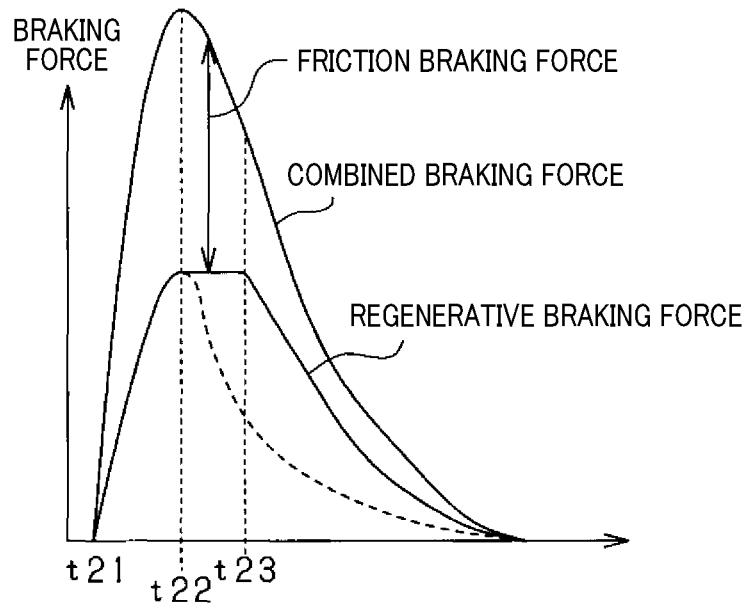
FIG. 9 is a time chart illustrating the change in the braking from the start to the end of the brake operation.

In FIG. 9, as in FIG. 7, a dashed line is used to illustrate the regenerative braking force when performing power generation control using only the first electric power generation amount. In other words, by setting the target electric power generation amount by switching the first to third relationships as in this embodiment, it is possible to increase the ratio of the regenerative braking force with respect to the target braking force.

The electric power generation control device of this embodiment, having the configuration described above, displays the following effects.

When the brake operation amount changes from increasing to decreasing when the first electric power generation amount that is calculated from the first relationship is taken to be the target electric power generation amount, the relationship is switched to the third relationship that maintains the first electric power generation amount at that time. Then the third electric power generation amount that is calculated from that third relationship is taken to be the target electric power generation amount. As a result, even when the brake operation amount changes from increasing to decreasing, the target electric power generation amount does not decrease, so it is possible to make the target electric power generation amount larger than when the target electric power generation amount is calculated using only the first relationship. Therefore, it becomes possible to obtain a large amount of electric power from regenerative electric power generation, and thus it is possible to improve fuel consumption.

When the third electric power generation amount that is calculated from the third relationship is taken to be the target electric power generation amount, and the second electric power generation amount that is calculated from the second relationship is less than the third electric power generation amount, the second electric power generation amount is made to be the target electric power generation amount. As a result, it is possible to reduce the target electric power generation amount when the driver is attempting to end brake operation, and it is possible to avoid deceleration from being performed by regenerative braking in conditions where deceleration is not required by the driver. Therefore, it is possible to improve drivability.

The target electric power generation amount at the time when the brake operation amount becomes a maximum is to be maintained, so it is possible to further increase the regenerative braking force that becomes larger in proportion to the target electric power generation amount. As a result, when the driver requires a certain target braking force, it is possible to obtain the regenerative braking force of when the brake operation amount is the maximum, even when the driver steps on the brake pedal 20 and decreases the brake operation amount. Consequently, it is possible to further reduce the friction braking force when a certain target braking force is required. Therefore, it is possible to suppress wear on the friction brake device 23.

When the brake operation amount changes from increasing to decreasing when the second electric power generation amount that is calculated from the second relationship is taken to be the target electric power generation amount, the relationship is switched to the third relationship that maintains the second electric power generation amount at that time. As a result, when the brake operation amount changes from decreasing to increasing, it is possible to prevent a state of a sudden increase in the target electric power generation amount, and it is possible to suppress deceleration that is not intended by the driver. Therefore, it is possible to improve drivability. Moreover, in this case, the target electric power generation amount is greater than the first electric power generation amount that is obtained based on the first relationship, so it becomes possible to obtain a lot of electric power from regenerative electric power generation, and thus it is possible to improve fuel consumption.

When the first electric power generation amount that is calculated from the first relationship is larger than the third electric power generation amount when the third electric power generation amount that is calculated from the third relationship is taken to be the target electric power generation amount, the first electric power generation amount is set to be the target electric power generation amount. As a result, when the driver requires a larger braking force, it is possible to set a larger target electric power generation amount.

Second Embodiment

Figure 10:
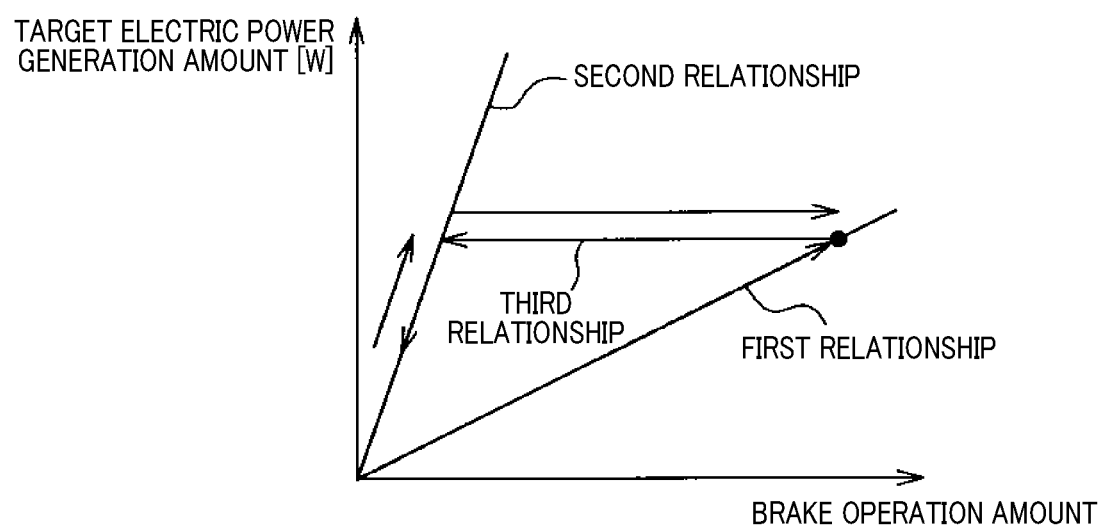
FIG. 10 illustrates the relationship between the brake operation amount and the target electric power generation amount in a second embodiment.

In this embodiment, part of the processing when selecting the first to third electric power generation amounts differs from in the first embodiment. The first to third relationships that set the first to third electric power generation amounts will be explained using FIG. 10.

The first relationship is a relationship in which the electric power generation amount is directly proportional with the brake operation amount. The second relationship is a relationship in which the electric power generation amount is directly proportional with the brake operation amount, and the proportionality factor is larger than in the first relationship.

The third relationship is a relationship in which, when the first electric power generation amount that is obtained based on the first relationship is taken to be the target electric power generation amount, and the brake operation amount changes from increasing to decreasing, the relationship is switched from the first relationship, and is a relationship that maintains the first electric power generation amount at the time of switching. This third relationship differs from in the first embodiment, in that the value is maintained until the state changes again to a state in which the first electric power generation amount is selected as the target electric power generation amount.

Switching from the second relationship to the third relationship is performed when the second electric power generation amount based on the second relationship becomes the same or greater than the third electric power generation amount. In other words, when the second electric power generation amount is taken to be the target electric power generation amount, and the second electric power generation amount is less than the third electric power generation amount, the state in which the second electric power generation amount is selected as the target electric power generation amount even when the brake operation amount changes from increasing to decreasing, or from decreasing to increasing.

However, the relationship is switched from the third relationship to the second relationship when the third electric power generation amount is taken to be the target electric power generation amount and the second electric power generation becomes less than the third electric power generation amount. Moreover, the relationship is switched from the third relationship to the first relationship when the third electric power generation amount is taken to be the target electric power generation amount and the first electric power generation amount becomes greater than the third electric power generation amount. In other words, when the third electric power generation amount is taken to be the target electric power generation amount and the value of the third electric power generation amount is equal to or greater than the first electric power generation amount and equal to or less than the second electric power generation amount, the state is maintained in which the third electric power generation amount is taken to be the target electric power generation amount even when the brake operation amount changes from increasing to decreasing, or from decreasing to increasing.

Figure 11:
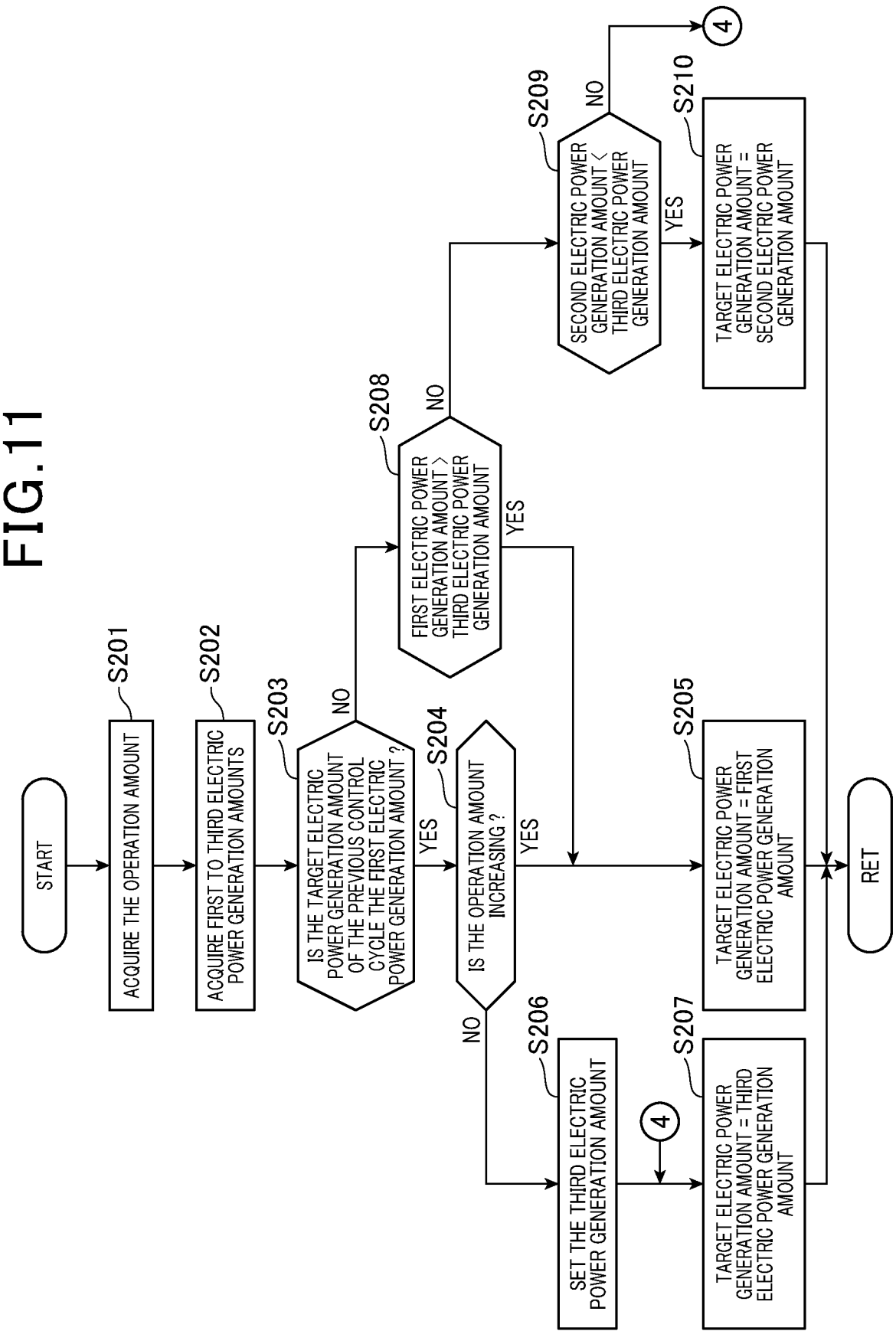
FIG. 11 is a flowchart illustrating the processing in a second embodiment.

Continuing, a sequence of processing that is executed by the electric power generation control ECU 10 will be explained using the flowchart in FIG. 11. The processing in the flowchart in FIG. 11 is repeatedly executed at each specified control cycle.

First, in step S201, the electric power generation control ECU 10 obtains the brake operation amount, and then in step S202, calculates the first electric power generation amount to third electric power generation amount based on the first to third relationships. Next, in step S203, the electric power generation control ECU 10 determines whether or not the first electric power generation amount is selected as the target electric power generation amount of the previous control cycle. When the determination in step S203 is positive, or in other words, when the target electric power generation amount of the previous control cycle is the first electric power generation amount, the electric power generation control ECU 10 advances to step S204. In step S204, the electric power generation control ECU 10 determines whether or not the brake operation amount is increasing. Specifically, the electric power generation control ECU 10 determines whether or not the brake operation amount is increasing by comparing the brake operation amount in the previous control cycle with the brake operation amount in the current control cycle. When the determination in step S204 is positive, or in other words, when it is determined that the brake operation amount is increasing, the electric power generation control ECU 10 sets the target electric power generation amount to be the first electric power generation amount in step S205, then ends the sequence of processing.

However, when the determination in step S204 is negative, or in other words, when it is determined that the brake operation amount is decreasing, this means that the brake operation amount is changed from increasing to decreasing while the first electric power generation amount is taken to be the target electric power generation amount. Therefore, the electric power generation control ECU 10 advances to step S206, and sets the target electric power generation amount in the previous control cycle as the third electric power generation amount. In other words, sets the value of the first electric power generation amount in the previous control cycle as the third electric power generation amount. Then, in step S207, the electric power generation control ECU 10 sets the target electric power generation amount to be the third electric power generation amount and ends the sequence of processing.

Returning to an explanation of step S203, when the determination in step S203 is negative, or in other words, when the target electric power generation amount in the previous control cycle is not the first electric power generation amount, the electric power generation control ECU 10 advances to step S208. In step S208, the electric power generation control ECU 10 determines whether or not the first electric power generation amount is greater than the third electric power generation amount. When the determination in step S208 is positive, or in other words, when the first electric power generation amount is greater than the third electric power generation amount, the electric power generation control ECU 10 advances to step S205 and sets the target electric power generation amount to be the first electric power generation amount, then ends the sequence of processing.

When the determination in step S208 is negative, or in other words, when the first electric power generation amount is less than the third electric power generation amount, the electric power generation control ECU 10 advances to step S209. In step S209, the electric power generation control ECU 10 determines whether or not the second electric power generation amount is less than the third electric power generation amount. When the determination in step S209 is positive, or in other words, when the second electric power generation amount is less than the third electric power generation amount, the electric power generation control ECU 10 advances to step S210 and sets the target electric power generation amount to be the second electric power generation amount, then ends the sequence of processing.

When the determination in step S209 is negative, or in other words, when the second electric power generation amount is equal to or greater than the third electric power generation amount, the electric power generation control ECU 10 advances to step S207 and sets the target electric power generation amount to be the third electric power generation amount, then ends the sequence of processing.

Figure 12:
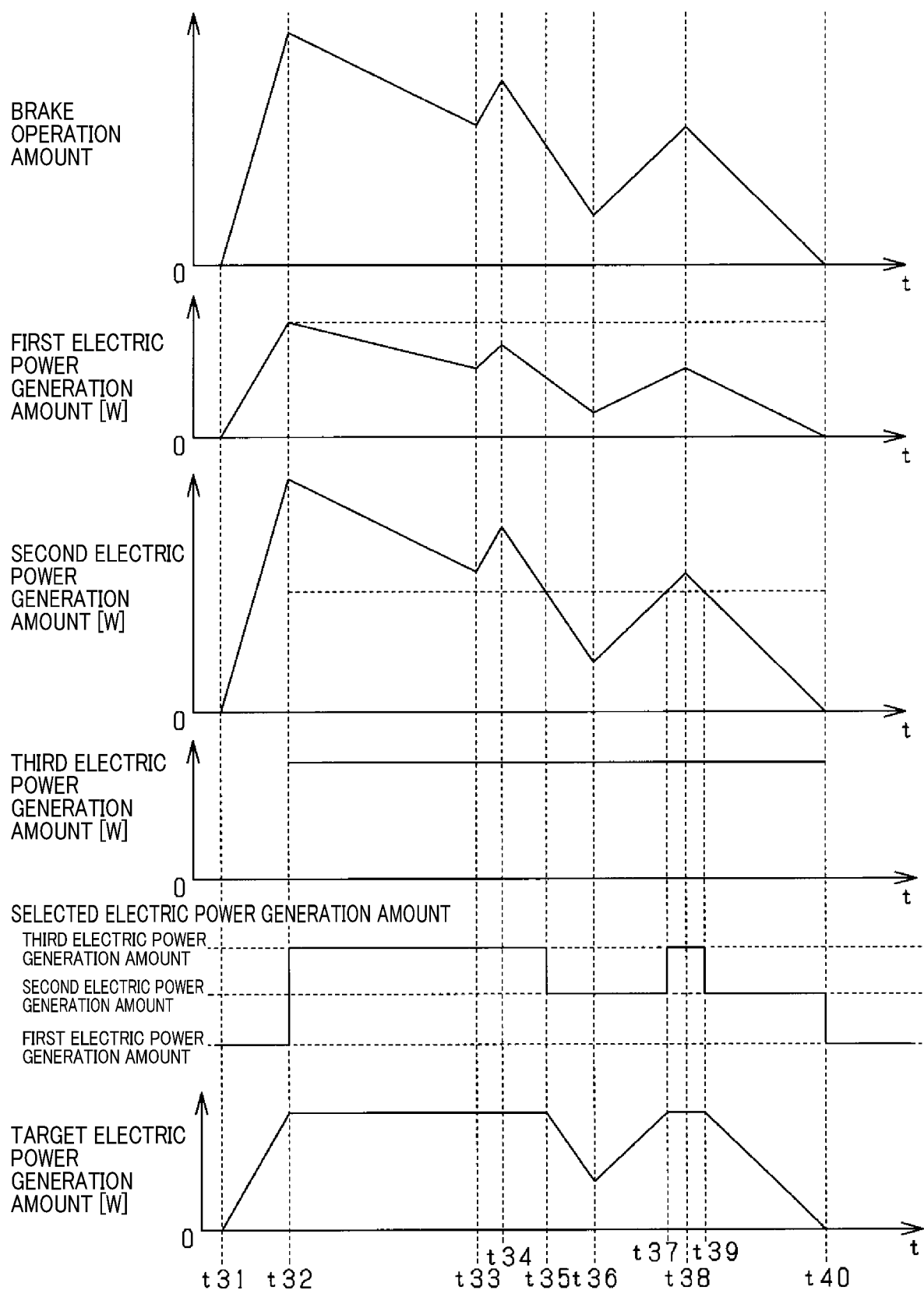
FIG. 12 is a time chart illustrating the processing in a second embodiment.

Continuing, the brake operation amount, the first to third electric power generation amounts, the selected electric power generation amount and the target electric power generation amount from start to the end of operation of the brake pedal 20 by the driver will be explained using the time chart in FIG. 12. FIG. 12 illustrates the brake operation amount, the first to third electric power generation amounts calculated by the first to third calculation units 12 to 14 based on the first to third relationships, the electric power generation amount that is selected from among the first to third electric power generation amounts, and the target electric power generation amount. In the time chart illustrating the change in the first electric power generation amount and in the time chart illustrating the change in the second electric power generation amount, the third electric power generation amount is indicated by a dashed line in order to make a comparison with the third electric power generation amount.

First, at time t31 when the driver begins to operate the brake, the first electric power generation amount that is obtained based on the first relationship is selected. This selection is continued until time t32 when the brake operation amount changes from increasing to decreasing. From time t31 to time t32, processing is transferred to step S205 via step S204 in FIG. 11.

At time t32, when the brake operation amount changes from increasing to decreasing, the first electric power generation amount at time t32 is set as the value of the third electric power generation amount. At this time t32, processing is transferred to step S207 via step S204 and step S206 in FIG. 11.

At time t32 and later, the second electric power generation amount is not less than the third electric power generation amount even when the brake operation amount continues to decrease, so the third electric power generation amount is selected. At time t33, the brake operation amount changes to increasing, and even though the brake operation amount continues up to time t34, the first electric power generation amount does not become greater than the third electric power generation amount, so the third electric power generation amount is selected. A time t34, the brake operation amount changes to decreasing, and even though the brake operation amount continues to decrease up to time t35, the second electric power generation amount does not become less than the third electric power generation amount, so the third electric power generation amount is selected. In other words, from time t32 to time t35, the third electric power generation amount is equal to or greater than the first electric power generation amount and is equal to or less than the second electric power generation amount, so the third electric power generation amount is selected as the target electric power generation amount. From time t32 to time t35, processing is transferred to step S207 via step S208 and step S209 in FIG. 11.

At time t35, when the second electric power generation amount becomes less than the third electric power generation amount, the second electric power generation amount is selected as the target electric power generation amount. From time t35 to time t36, the brake operation amount gradually decreases, and the second electric power generation amount is less than the third electric power generation amount, so the second electric power generation amount is selected as the target electric power generation amount. At time t36, even though the brake operation amount changes from decreasing to increasing, until time t37 the second electric power generation amount is less than the third electric power generation amount, so processing in which the second electric power generation amount is selected as the target electric power generation amount is continued. From time t35 to time t37, processing is transferred to step S210 via step S208 and step S209.

At time t37, the second electric power generation amount is equal to or greater than the third electric power generation amount, so the third electric power generation amount is selected as the target electric power generation amount. Subsequently, at time t38, the brake operation amount changes from increasing to decreasing, and after that, at time t39 and until the second electric power generation amount becomes less than the third electric power generation amount again, the third electric power generation amount is selected as the target electric power generation amount. From time t37 to time t39, processing is transferred to step S207 via step S208 and step S209.

At time t40, when the brake operation amount becomes zero, the second electric power generation amount becomes zero, so the target electric power generation amount becomes zero. For the processing after the brake operation amount becomes zero, the same processing as in the first embodiment can be performed, so a detailed explanation is omitted.

With the configuration described above, the electric power generation control device of this embodiment, in addition to the effects of the electric power generation control device of the first embodiment, has the following effects.

As a driver performs a sequence of brake operations, and a target electric power generation amount is set based on a second relationship according to a decrease in the brake operation amount, when the brake operation amount changes to increasing, the target electric power generation amount increases based on the second relationship. As a result, when the target electric power generation amount is set based on the second relationship, it is possible to further increase the target electric power generation amount when the brake operation amount is increased as the driver requires braking force. In addition, when the second electric power generation amount that is calculated based on the second relationship is equal to or greater than the third electric power generation amount that is calculated based on the third relationship, the third electric power generation amount is taken to be the target electric power generation amount. As a result, it is possible to keep the target electric power generation amount from becoming an excessive value, and thus it is possible to maintain drivability.

Third Embodiment

Figure 13:
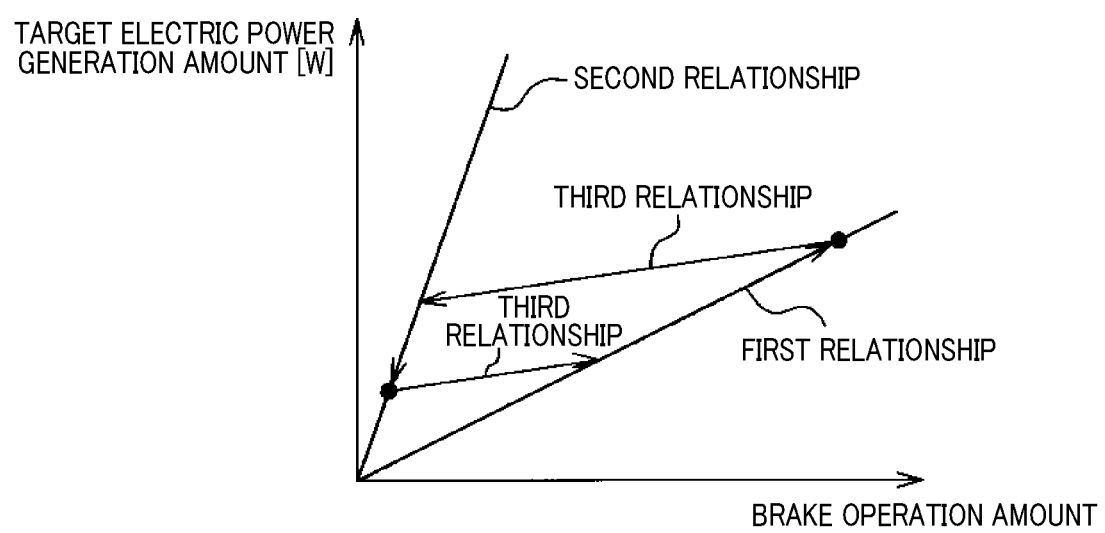
FIG. 13 illustrates the relationship between the brake operation amount and the target electric power generation amount in a third embodiment.

With this embodiment, the third relationship that is used when calculating the third electric power generation amount is different than in the first embodiment. The first relationship to the third relationship that set the first to third electric power generation amounts will be explained using FIG. 13.

The first relationship is a relationship that is used when the brake operation amount increases, and the electric power generation amount is directly proportional to the brake operation amount. The second relationship is a relationship that is used when the brake operation amount decreases and the electric power generation amount is directly proportional to the brake operation amount, and is a relationship in which the proportionality coefficient is larger than in the first relationship.

The third relationship is a relationship that is switched to from the first relationship when the first electric power generation amount that is obtained based on the first relationship is taken to be the target electric power generation amount and the brake operation amount changes from increasing to decreasing. Moreover, the third relationship is a relationship that is switched to from the second relationship when the second electric power generation amount that is obtained based on the second relationship is taken to be the target electric power generation amount and the brake operation amount changes from decreasing to increasing. This third relationship is such that when switched to from the first relationship, the value at the time of switching is a value equal to the first electric power generation amount that is based on the first relationship before switching.

With this configuration, the electric power generation control device of this embodiment has an effect that is similar to that of the first embodiment.

Modifications (M1) In the embodiments, in the first relationship and the second relationship, the electric power generation amount is directly proportional to the brake operation amount. In regard to this point, as long as both the first relationship and the second relationship are a relationship in which the electric power generation amount becomes larger the larger the brake operation amount is, then in at least one of the first relationship and the second relationship, the electric power generation amount does not need to be directly proportional to the brake operation amount. Moreover, in regard to the third relationship in the third embodiment, similarly, as long as the relationship is such that the electric power generation amount becomes larger the larger the brake operation amount is, the electric power generation amount does not need to be directly proportional to the brake operation amount.

(M2) In the first relationship, an upper limit value may be set for the electric power generation amount. In that case, when the first electric power generation amount that is calculated from the first relationship and the brake operation amount is the upper limit value and the brake operation amount changes to decreasing, that upper limit value may be set as the value of the third relationship. In the first embodiment, the second electric power generation amount does not reach the upper limit value of the electric power generation amount in the first relationship, so for the second relationship, whether or not to set an upper limit value for the electric power generation amount is arbitrary. Moreover, in the second embodiment, the second electric power generation amount does not reach a value that is larger than the upper limit value of the electric power generation amount in the first relationship, so similarly, for the second relationship, whether or not to set an upper limit value for the electric power generation amount is arbitrary.

(M3) Typically, play is provided in the brake pedal 20 in which operation of the friction brake device 23 is not performed when the brake operation amount is in small steps. Therefore, when the value of brake operation amount is less than a certain value, the first electric power generation amount and the second electric power generation amount that are calculated from the first relationship and second relationship are both zero, and regenerative electric power generation can be considered as not being performed. Moreover, when the brake operation amount is less than a certain value, the proportionality coefficient can be taken to be a smaller value.

(M4) In this embodiment, the target electric power generation amount is set by switching among first to third relationships, however, the target electric power generation amount may also be set by switching among four or more relationships.

(M5) In the embodiments, a target electric power generation amount is set by switching among first to third relationships, however the target electric power generation amount may be set by switching between two relationships. For example, one relationship can be a linear function relationship as in the embodiments, and the other relationship can be a square root function, and when the brake operation amount is increasing, the linear function relationship is used, and when the brake operation amount changes from increasing to decreasing, the square root function is used. Alternatively, one relationship can be a linear function relationship as in the embodiments, and the other relationship can be a quadratic function, and when the brake operation amount is increasing, the quadratic function is used, and when the brake operation amount changes from increasing to decreasing, the linear function is used. In this way, as in each of the embodiments, the target electric power generation amount can be made to be larger when the brake operation amount is decreasing, and when the driver is near the end of a brake operation, the target electric power generation amount can be greatly decreased.

(M6) In the embodiments, the stroke amount of the brake pedal 20 is detected by a brake sensor 21, and that stroke amount is taken to be the brake operation amount. In this regard, the pressure of a master cylinder of the friction brake device 23 may also be taken to be the brake operation amount.

(M7) In the embodiments, there are a first battery 26 and a second battery 28, however, at least one battery should be provided. Where one battery is provided, the type of that battery can be selected arbitrarily.

(M8) In the embodiments, a battery is used as an electric power storage device, however, it is possible to use an electric power storage device that is a device other than a battery, and for example, a capacitor may be used.

(M9) In the embodiments, an internal combustion engine is taken to be the drive source of a vehicle, the generation 25 is taken to be an alternator, and that alternator is controlled by an electric power generation control ECU 10. In this regard, the target for mounting the electric power generation control ECU is not limited to a vehicle having an internal combustion engine as a drive source. For example, an electric power generation control ECU can be applied to a hybrid car that uses both an internal combustion engine and motor as the drive source, and that motor can be used as the generator. Moreover, an electric power generation control ECU can be applied to an electric automobile or fuel cell automobile that uses only a motor as the drive source, and that motor can be used as the generator.

What is claimed is:

1. An electric power generation control device that is applied to a system that comprises:
   a generator that is connected to a drive shaft of a vehicle and is capable of regenerative electric power generation using regenerative energy during deceleration of the vehicle;
   an electric power storage device that is capable of being charged with electric power that is generated by the generator; and
   a friction brake device that generates a braking force according to a brake operation by a driver of the vehicle;
   the electric power generation control device comprising:
   an operation amount acquisition unit that acquires a brake operation amount of the friction brake device by the driver of the vehicle;
   an electric power generation amount acquisition unit that selects between a plurality of relationships, the plurality of relationships being different functions between the brake operation amount and a target electric power generation amount for the generator, the different functions either keeping the target electric power generation amount constant or increasing the target electric power generation amount as the brake operation amount increases, the electric power generation amount acquisition unit (i) detecting a change in the brake operation amount by comparing the brake operation amount with a previously acquired brake operation amount, (ii) selecting one of the plurality of relationships in response to the change in the brake operation amount, and (iii) acquiring the target electric power generation amount based on the selected one of the plurality of relationships and the brake operation amount; and
   an electric power generation amount instruction unit that controls the generator based on the target electric power generation amount that is acquired by the electric power generation amount acquisition unit, wherein
   the electric power generation amount acquisition unit has as the plurality of relationships, a first relationship, a second relationship in which the target electric power generation amount is set to be greater than in the first relationship, and a third relationship in which the target electric power generation amount is set to be larger than in the first relationship and less than in the second relationship when the brake operation amount is within a specified range;
   the target electric power generation amount is set based on the first relationship when the brake operation amount is increasing;
   the relationship is switched from the first relationship to the third relationship when the target electric power generation amount is set based on the first relationship and the brake operation amount changes from increasing to decreasing; and
   the relationship is switched from the third relationship to the second relationship when the target electric power generation amount is set based on the third relationship and the target electric power generation amount that is set based on the second relationship is less than the target electric power generation amount that is set based on the third relationship.

2. The electric power generation control device according to claim 1, wherein
   when the target electric power generation amount is set based on the second relationship and the brake operation amount changes from decreasing to increasing, the relationship is switched from the second relationship to the third relationship.

3. The electric power generation control device according to claim 1, wherein
   when the target electric power generation amount is set based on the second relationship and the target electric power generation amount that is calculated from the second relationship is greater than the target electric power generation amount that is calculated from the third relationship, the relationship is switched from the second relationship to the third relationship.

4. The electric power generation control device according to claim 1, wherein
   when the target electric power generation amount is set according to the third relationship and the target electric power generation amount that is set based on the first relationship is greater than the target electric power generation amount that is set based on the third relationship, the relationship is switched from the third relationship to the first relationship.

5. The electric power generation control device according to claim 1, wherein
   the third relationship maintains the target electric power generation amount constant at a value acquired at a time when the relationship is switched to the third relationship.

6. The electric power generation control device according to claim 1, wherein
   the third relationship is a relationship in which the target electric power generation amount with respect to the brake operation amount at a time when the relationship is switched to the third relationship is equal to the target electric power generation amount with respect to the brake operation amount based on the first relationship, and the amount that the target electric power generation amount decreases when the brake operation amount is decreased by a specified amount is less than in the first relationship.

7. The electric power generation control device according to claim 1, wherein
   the system comprises as the electric power storage device a first electric power storage device and a second electric power storage device that has a higher energy efficiency than the first electric power storage device;

the generator and the first electric power storage device and second electric power storage device are connected by a switch that switches between a conducting state and a shut off state; and the electric power generation control device further comprises a control unit that sets the switch to the conducting state during regenerative electric power generation.

8. The electric power generation control device according to claim 1, wherein
the operation amount acquisition unit acquires a stroke amount of a brake pedal of the vehicle as the brake operation amount.

9. The electric power generation control device according to claim 1, wherein
the operation amount acquisition unit acquires pressure in a master cylinder of the friction brake device as the brake operation amount.

10. The electric power generation control device according to claim 1, wherein
the generator comprises a rotor that is connected to the drive shaft, a rotor coil that is wound around the rotor, and a stator coil, and power is supplied to the electric power storage device by current that flows in the stator coil; and
the electric power generation amount instruction unit controls an excitation current that flows in the rotor coil based on the target electric power generation amount.

11. The electric power generation control device according to claim 1, wherein
the electric power generation amount acquisition unit (a) selects the first relationship when the brake operation amount is increasing, (b) selects the second relationship when the brake operation amount is decreasing, and (c) selects the third relationship when switching from the first relationship to the second relationship and when switching from the second relationship to the first relationship.

12. The electric power generation control device according to claim 11, wherein
the first relationship and the second relationship increase the target electric power generation amount by different amounts for a same increase in the brake operation amount within a given range, and the third relationship maintains the target electric power generation amount constant at a value acquired at a time when the relationship is switched to the third relationship from either the first relationship or the second relationship.

13. The electric power generation control device according to claim 1, wherein
the first relationship and the second relationship increase the target electric power generation amount by different amounts for a same increase in the brake operation amount within a given range,
the electric power generation amount acquisition unit selects the third relationship when switching from the first relationship to the second relationship and when switching from the second relationship to the first relationship, and
the third relationship maintains the target electric power generation amount constant at a value acquired at a time when the relationship is switched to the third relationship from either the first relationship or the second relationship.

14. The electric power generation control device according to claim 1, wherein
the electric power generation amount acquisition unit detects the change in the brake operation amount by comparing the brake operation amount during a current control cycle with the previously acquired brake operation amount of a previous control cycle.

15. The electric power generation control device according to claim 1, wherein
the electric power generation amount acquisition unit selects one of the plurality of relationships in response to the change in the brake operation amount such that a ratio of a regenerative braking force to a target braking force is increased as compared to a case where there is only a directly proportional relationship between the brake operation amount and the target electric power generation amount for the generator, the regenerative braking force being a braking force proportional to the target electric power generation amount, the target braking force having a targeted value of a combined braking force given by a sum of the regenerative braking force and a friction braking force generated by the friction brake device.

* * * * *